United States Patent
Djakovic et al.

(10) Patent No.: US 9,788,198 B2
(45) Date of Patent: Oct. 10, 2017

(54) PROTECTING RADIO TRANSMITTER IDENTITY

(71) Applicant: Signal Laboratories, Inc., Menlo Park, CA (US)

(72) Inventors: Vladan Djakovic, San Francisco, CA (US); Joel Daniel Brinton, Redwood City, CA (US); Benjamin Joseph Vivaldi Morse, Redwood City, CA (US)

(73) Assignee: Signal Laboratories, Inc., Menlo Park, CA (US)

( * ) Notice: Subject to any disclaimer, the term of this patent is extended or adjusted under 35 U.S.C. 154(b) by 97 days.

(21) Appl. No.: 14/821,648

(22) Filed: Aug. 7, 2015

(65) Prior Publication Data

US 2016/0044503 A1   Feb. 11, 2016

Related U.S. Application Data (60) Provisional application No. 61/999,821, filed on Aug. 7, 2014, provisional application No. 61/999,818, filed on Aug. 7, 2014.

(51) Int. Cl.
| | |
|---|---|
| *H04L 29/06* | (2006.01) |
| *H04W 12/02* | (2009.01) |
| *H04L 9/08* | (2006.01) |
| *H04W 28/02* | (2009.01) |
| *H04W 72/04* | (2009.01) |

(52) U.S. Cl.
CPC ......... *H04W 12/02* (2013.01); *H04L 9/0825* (2013.01); *H04L 9/0869* (2013.01); *H04L 63/045* (2013.01); *H04L 63/0407* (2013.01); *H04L 63/0435* (2013.01); *H04L 63/068* (2013.01); *H04W 28/0289* (2013.01); *H04W 72/0446* (2013.01); *H04W 72/0453* (2013.01); *H04W 72/0486* (2013.01); *H04L 63/0414* (2013.01); *H04L 2209/80* (2013.01)

(58) Field of Classification Search
None
See application file for complete search history.

(56) References Cited

U.S. PATENT DOCUMENTS

| | | | |
|---|---|---|---|
| 6,532,220 B1 * | 3/2003 | Carneal | H04B 7/18582 370/329 |
| 6,882,727 B1 * | 4/2005 | Vialen | H04W 12/02 380/259 |
| 2001/0037453 A1 * | 11/2001 | Mitty | H04L 51/30 713/168 |
| 2002/0073229 A1 * | 6/2002 | Hayashi | H04L 63/0442 709/237 |

(Continued)

*Primary Examiner* — Malcolm Cribbs
(74) *Attorney, Agent, or Firm* — Fenwick & West LLP (57) ABSTRACT

A system and a method are disclosed for protecting the privacy of a wireless data transmission. A request is received from a client device to connect to a base station. A session identification is assigned to the client device and a set of transmission identifications are generated using a block cipher with the assigned session identification and a secret key as input. The transmission identifications identify a frequency channel and a time slot for the client device to wirelessly transmit a message to the base station. The set of transmission identifications are then encrypted and sent to the client device.

34 Claims, 4 Drawing Sheets

(56) References Cited

U.S. PATENT DOCUMENTS

| | | | | |
|---|---|---|---|---|
| 2003/0086565 | A1* | 5/2003 | Desai | G06F 7/58 |
| | | | | 380/45 |
| 2006/0031936 | A1* | 2/2006 | Nelson | H04L 9/083 |
| | | | | 726/23 |
| 2008/0014975 | A1* | 1/2008 | Jin | H04W 72/042 |
| | | | | 455/511 |
| 2009/0034467 | A1* | 2/2009 | Chakraborty | H04W 72/0446 |
| | | | | 370/330 |
| 2010/0120359 | A1* | 5/2010 | Agarwal | H04B 7/18539 |
| | | | | 455/12.1 |
| 2010/0315949 | A1* | 12/2010 | Agarwal | H04B 7/18515 |
| | | | | 370/235 |
| 2011/0183698 | A1* | 7/2011 | Hoctor | H04W 52/367 |
| | | | | 455/509 |
| 2012/0033623 | A1* | 2/2012 | Chu | H04W 76/02 |
| | | | | 370/329 |
| 2014/0140321 | A1* | 5/2014 | Janakiraman | H04L 69/08 |
| | | | | 370/331 |
| 2016/0029348 | A1* | 1/2016 | Petrie | H04L 63/00 |
| | | | | 455/450 |

* cited by examiner

PROTECTING RADIO TRANSMITTER IDENTITY

CROSS REFERENCE TO RELATED APPLICATIONS

This application claims the benefit of U.S. Provisional Application No. 61/999,821, filed Aug. 7, 2014, and U.S. Provisional Application No. 61/999,818, filed Aug. 7, 2014, both of which are incorporated by reference in their entirety.

BACKGROUND

1. Field of Art

The disclosure generally relates to the field of wireless communications, and more specifically to protecting the identity of a wireless transmitter.

2. Description of the Related Art

When multiple radio transmitters use a shared communication channel, the transmitter implicitly or explicitly identifies itself to allow the recipient of a message sent by the transmitter to determine the identity of the transmitter. For instance, a transmitter may implicitly identify itself by transmitting the message using a specific frequency channel during a specific time slot.

Using this approach, a third party system listening to the wireless signals transmitted at the specific frequency channel may be able to reconstruct the messages sent by the transmitter. That is, users other than the intended recipient of a message may be able to intercept the messages and identify the information being transmitted. As such, there is a need to increase the security of transmissions that implicitly identifies the identity of the transmitter to protect the privacy of the message being transmitted.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium for protecting the privacy of a wireless data transmission. A domain authority receives a request from a client device to connect to a base station. A session identification is assigned to the client device and a set of transmission identifications are generated based on the assigned session identification. The transmission identifications identify a frequency channel and a time slot for the client device to wirelessly transmit a message to the base station. In some embodiments, the set of transmission identifications are pseudo-randomly generated based on the session identification and a secret key generated by the domain authority. The set of transmission identifications are then sent to the client device. After receiving the set of transmission identifications, the client device may send messages wirelessly to the base station using the transmission identification included in the set of transmission identification. In one embodiment, each of the transmission identifications included in the set of transmission identifications are only used once by the client device.

Computing Machine Architecture

Figure 1:
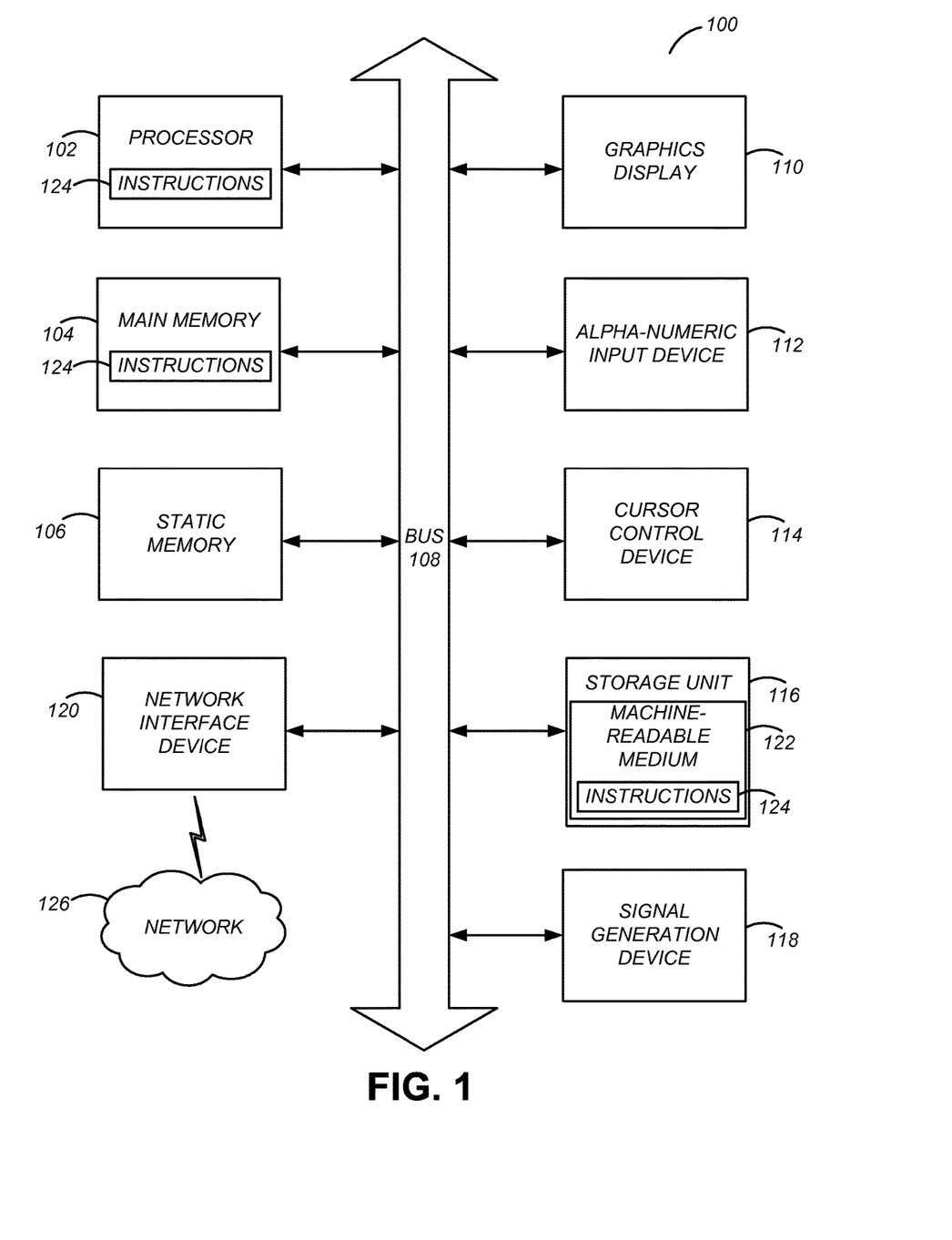
FIG. 1 illustrates one embodiment of components of an example machine able to read instructions from a machine-readable medium and execute them in a processor (or controller).

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 120, which also are configured to communicate via the bus 108.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

System Environment

Figure 2:
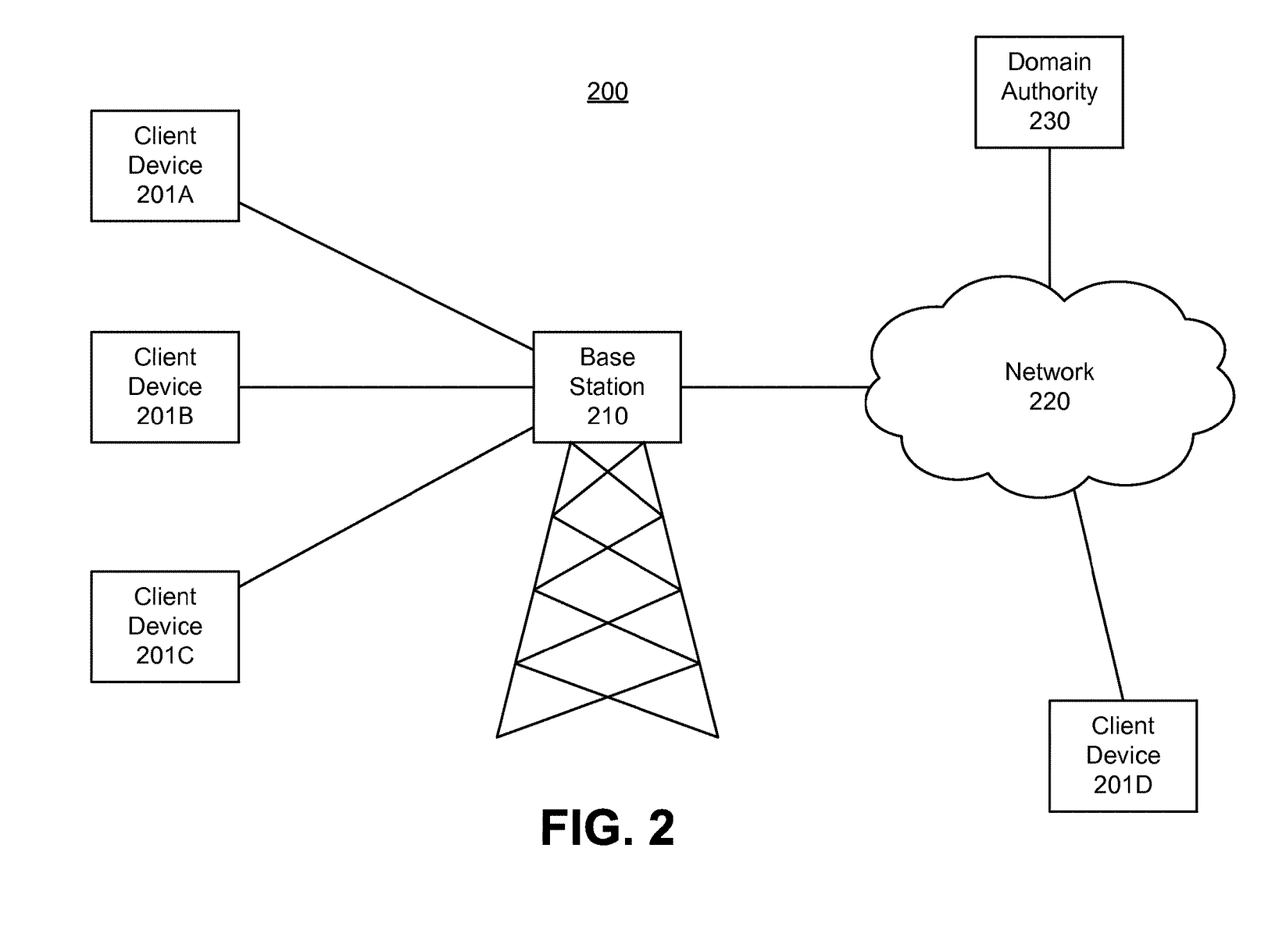
FIG. 2 illustrates a system environment for wireless data transmission, according to one embodiment.

FIG. 2 illustrates a system environment for wireless data transmission, according to one embodiment. The system environment 200 includes multiple client devices 201, a base station 210, a network 220, and a domain authority 230. In alternative configurations, different and/or additional components may be included in the system environment 200. Each client devices 201, the base station 210, or the domain authority 230 may be comprised of components as described with the example computer system 100.

A client device 201 is one or more computing devices capable of receiving user input as well as transmitting and/or receiving data via the network 220. In one embodiment, the client device 201 is a conventional computer system, such as a desktop computer or a laptop computer. Alternatively, the client device 201 may be a device having computer functionality, such as a personal digital assistant (PDA), a mobile telephone, a smartphone or another suitable device. A client device 201 is configured to communicate with other devices via the network 220.

Client device 201 may connect to the network 220 via a base station 210. For instance, client devices 201A, 201B, and 201C send data wirelessly to the base station (e.g., a cellular base station, or a wireless router) and the base station forwards the data to the network to be sent to their corresponding recipient. Additionally, the base station receives data addressed to client devices 201A, 201B, and/or 201C and sends the data wirelessly to the corresponding client device.

In some embodiments, client devices 201 subscribe with the base station prior to sending or receiving data via the base station 210. For instance, client devices 201 may send a request to the base station 210 to subscribe with the base station. The base station 210 may grant or deny the request. The base station 210 may additionally send an identifier to the client device 201 requesting to subscribe with the base station 210.

In some embodiments, a domain authority 230 handles the subscription of a client device 201 with the base station 210. For instance, a client device 201 may request to subscribe with the base station 210. The base station 210 forwards the request to the domain authority 230 and the domain authority grants or denies the request and generates an identifier for the client device 201. The domain authority 230 sends the generated identifier for the client device 201 to the base station 210, and the base station 210 sends a response to the client device 201 that includes the identifier generated by the domain authority 230.

The network 220 may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), user datagram protocol (UDP), hypertext transport protocol (HTTP), simple mail transfer protocol (SMTP), and file transfer protocol (FTP). Data exchanged over the network 220 may be represented using any suitable format, such as hypertext markup language (HTML), extensible markup language (XML) or JavaScript Object Notation (JSON). In some embodiments, all or some of the communication links of the network 220 may be encrypted using any suitable technique or techniques.

Radio Transmitter Identification

Figure 3:
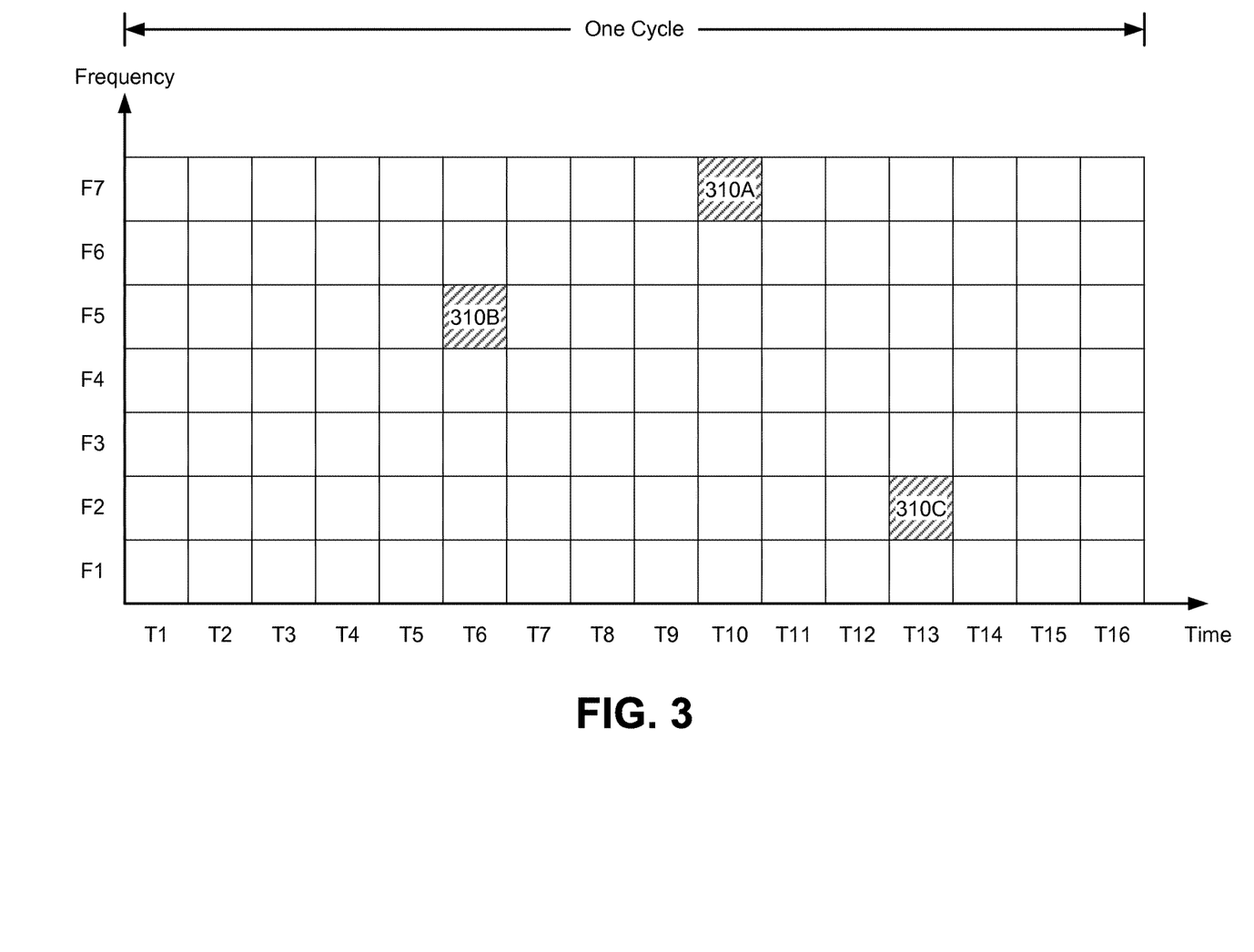
FIG. 3 illustrates a graph showing multiple radio transmission slots to be used by client devices to connect to the network via a base station, according to one embodiment.

FIG. 3 illustrates a graph showing multiple radio transmission slots to be used by client devices to connect to the network via a base station, according to one embodiment. The graph of FIG. 3 has a first axis with multiple time slots, and a second axis with multiple frequency slots. As used herein, a radio transmission slot is characterized by a time slot and a frequency channel. For instance, radio transmission slot 310A is characterized by time slot T10 and frequency channel F7. That is, a client device 201 that is assigned to radio transmission slot 310A can transmit data during time T10 using a frequency of F7. Similarly, radio transmission slot 310B is characterized by time slot T6 and frequency channel F5; and radio transmission slot 310C is characterized by time slot T13 and frequency channel F2. The radio transmission slot repeats periodically, and thus, in the example of FIG. 3 a client device 201 that is assigned to a specific radio transmission slot 310 may wirelessly transmit data using the allocated frequency every 16 time slots. In some embodiments, the base station assigns a radio transmission slot to a client device that sends a connection request to the base station.

If there is at most only one client device subscribed (i.e., a subscriber) per radio transmission slot, the radio transmission slot identifies the transmitter. For instance, if client device 201A is assigned to radio transmission slot 310A, and a wireless transmission is received at frequency F7 during time slot T10, the receiver of the wireless transmission can identify the transmitter of the wireless signal as client device 201, without client device 201 having to transmit identification information together with the transmitted data. This beneficially reduces the amount of data transmitted during each wireless transmission and thus, reducing the bandwidth utilization overhead of the wireless transmission channels.

In some embodiments, it is beneficial to have multiple client devices 201 subscribed to a single radio transmission slot 310. For instance, in the example of FIG. 3, if only one client device 201 is subscribed to each radio transmission slot 310, at most 112 distinct client devices are able to transmit data. Since client devices may not always have data to transmit, each radio transmission slot 310 can be shared by two or more client device. In this embodiment, each client device may be assigned a digital identifier to identify the different client devices subscribed to a single radio transmission slot 310. For instance, if a 10-bit digital identifier is assigned to client devices subscribed to a specific radio transmission slot 310, 1024 client devices may be able to subscribe to the specific radio transmission slot 310, thus increasing the maximum total number of subscribers from 112 to 114,688.

When receiving a transmission, the receiver may identify the transmitter based on the radio transmission slot 310 at which the transmission was received and the digital identifier included in with the received transmission. As such, the combination of a radio transmission slot 310 and a digital identifier forms a transmitter identification (TID) that uniquely identifies a transmitter to a receiver.

Transmitter Identification Protection

A third party receiver may be able to intercept the transmissions of a client device by listening for wireless signals in a specific frequency channel at specific time slots. For instance, the third party receiver may be able to intercept the communications between a first client device subscribed to radio transmission slot 310A and a second client device by listening for wireless signals with a frequency of F7 during time slots T10. This way, the third party system is capable of reconstructing the transmissions sent to the second client device. For instance, a position tracking device may broadcast its position periodically using a radio transmission slot assigned to the tracking device. Thus, any receiver listening to the radio transmission slot assigned to the tracking device is able to reconstruct the physical location or the path of the tracking device.

In order to protect the privacy of a transmission of a client device, the client device is assigned to multiple transmitter identifications (TIDs). For instance, a client device is assigned to a set of random (or pseudo random) TIDs and thus, a next TID cannot be inferred from a previously used TID. A client device transmits multiple messages using different TIDs, and thus, only receivers that have previous knowledge of the set of TIDs assigned to the client device is able to identify the plurality of messages as being transmitted by the client device.

Figure 4:
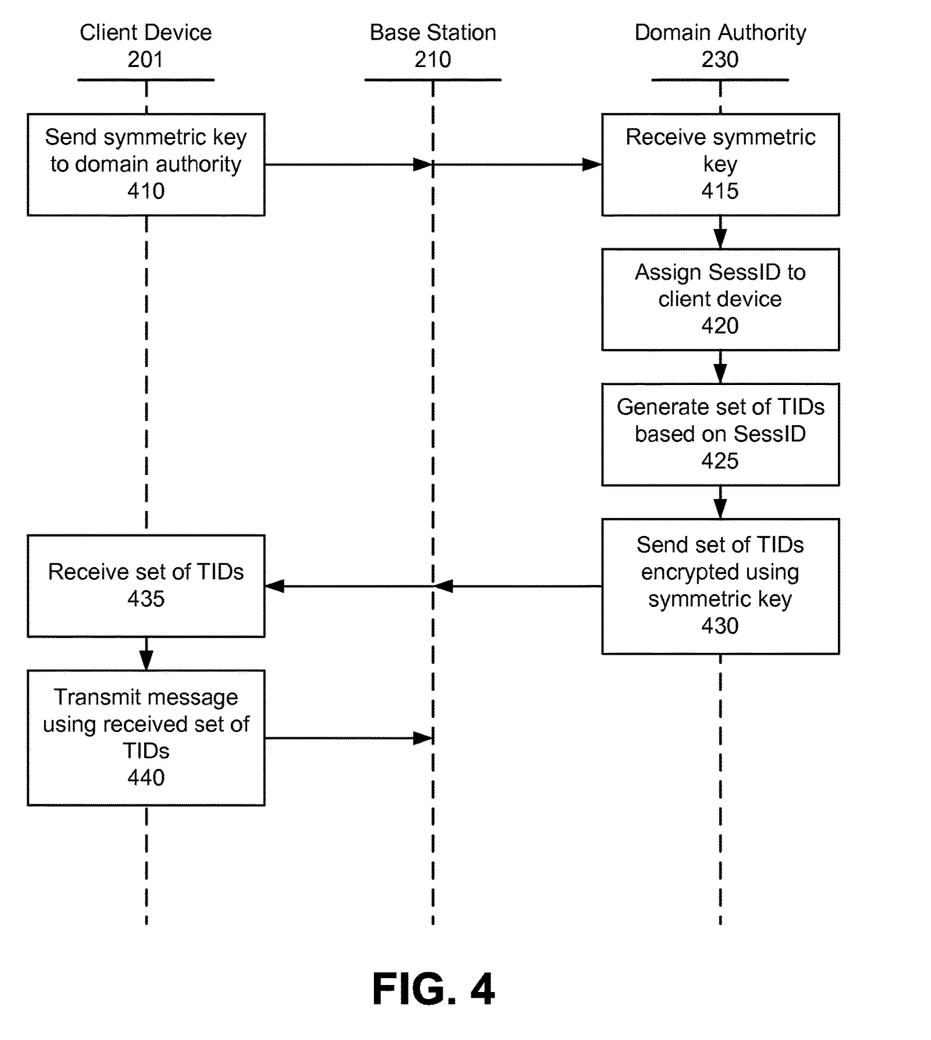
FIG. 4 illustrates a flow diagram of a process for transmitting messages using multiple TIDs, according to one embodiment.

FIG. 4 illustrates a flow diagram of a process for transmitting messages using multiple TIDs, according to one embodiment. FIG. 4 shows the process through the client device 201, the base station 210, and the domain authority 230. Each of the device 201, the base station 210, and the domain authority 230 may be configured to include components of the computer system of FIG. 1 and execute the process steps as instructions as further described herein.

A client device sends 410 a symmetric key (sK) to the domain authority 230, and the domain authority 230 receives 415 the symmetric key sK. For instance, the client device sends the symmetric key sK using a public-private key encryption algorithm. That is, the client device 201 generates a symmetric key and encodes the symmetric key using the public key of the domain authority 230. The encoded symmetric key is sent to the domain authority 230, which decodes the encoded symmetric key using a private key associated with the public key used by the client device 201 to encode the symmetric key.

In some embodiments, the client device generates a random number (xID) and includes the random number xID unencrypted in the message including the encrypted symmetric key sK. The base station 210 receives the unencrypted random number xID and the encrypted symmetry key sK. The base station 210 stores an association between the client device 201 and the random number xID and forwards the received unencrypted random number xID and the encrypted symmetry key sK to the domain authority 230. In some embodiments, the client device 201 may include additional encrypted information in the message including the encrypted symmetric key sK. For instance, the client device 201 may include a client identifier (ID) and the time to the message including the encrypted symmetric key sK.

The domain authority 230 assigns 420 a session ID (SessID) to the client device 201. In some embodiments, the SessID assigned to the client device is unique. Based on the assigned SessID, the domain authority 230 generates 425 a set of TIDs to assign to the client device 201. For instance, the domain authority may use a block cipher to generate the set of TID.

In one embodiment, the domain authority 230 generates a set of values based on the SessID associated with the client device. For example, the domain authority generates n consecutive values, where n is a positive integer number, starting at (SessID×n). The domain authority 230 then applies a block cipher to the generated set of values. In the previous example, the domain authority 230 applies the block cipher to each of the n values (SessID×n) consecutively. The block cipher may be used together with a secret key (Ksec) generated by the domain authority 230. In some embodiments, Ksec is generated periodically (e.g., daily). As such, the TIDs generated by the domain authority may look as follows:

$$TID[i]=Benc(Ksec, SessID \times n+i)$$

Where TID[i] is the i-th TID, Benc is an encoding function of the block cipher, Ksec is a secret key generated by the domain authority, SessID is a session ID assigned to the client device, n is the number of TIDs generated, and i is an integer number from 0 to n.

The generated set of TIDs are encrypted using the symmetric key and sent 430 to the client device. The message including the encrypted set of TIDs may also include the unencrypted random number xID received from the client device. The unencrypted random number xID is used by the base station 210 to determine the recipient of the message including the encrypted set of TIDs. Additionally, a mapping table may be updated to map the generated TIDs to the SessID. When a transmission is received, the TID may be determined based on the frequency channel and time slot at which the transmission is received, and a digital identifier include in the received transmission. Based on the determined TID and the mapping, the SessID, and thus, the client device, is identified.

The client device 201 receives 435 the encrypted set of TIDs and decrypts the encrypted set of TIDs using the symmetric key sK. The client device 201 then uses the set of received TIDs to wirelessly communicate with the base station. In some embodiments, the received TIDs are used sequentially. In other embodiments, the client device randomly selects a TID from the received set of TIDs. In one embodiment, the TIDs are only used once. When a client device has used all the TIDs, the client device may request additional TIDs from the domain authority. In some embodiments, after receiving a transmission with a specific TID, the mapping between the TID of the received transmission and the SessID of the sender of the transmission is deleted.

Additional Configuration Considerations

The disclosed embodiments beneficially allow for protecting the privacy of transmission of a client device since third party listener is not able to predict, reconstruct, or gain any knowledge about the transmission frequencies, transmission times, or contents of the transmissions of the client device without knowledge of the secret key Ksec.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein. For instance, the processes described in FIG. 4 may be executable by the machine illustrated in FIG. 1.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for protecting the privacy of a client device transmitting a message via a wireless signal, the method comprising:
    receiving a request, from the client device, to connect to a base station;
    associating a session identification to the client device;
    generating a set of transmission identifications based on the session identification comprising generating a plurality of pseudo-random numbers based on the session identification and a secret key, each transmission identification of the set of the transmission identifications identifying a frequency channel and a time slot for the client device to wirelessly transmit a message to the base station;
    storing a mapping between the transmission identifications of the set of transmission identifications and the session identification associated with the client device;
    transmitting the set of transmission identifications to the client device;
    receiving the message; and
    identifying a transmission identification, based at least in part on a frequency channel and a time slot at which the message is received.

2. The method of claim 1, wherein the secret key is replaced at predefined time intervals.

3. The method of claim 2, wherein the predefined time intervals are random.

4. The method of claim 1, wherein the pseudo-random number is generated using a block cipher.

5. The method of claim 1, further comprising generating a plurality of consecutive values based on the session identification, and wherein each of the transmission identifications of the set of transmission identifications is generated based on a previous value of the generated plurality of consecutive values.

6. The method of claim 1, further comprising receiving a symmetric key from the client device; and wherein transmitting the set of transmission identification comprises:
    encrypting the set of transmission identifications using the symmetric key; and
    transmitting the encrypted set of transmission identifications to the client device.

7. The method of claim 6, wherein receiving the symmetric key comprises:
    receiving an encrypted message, the encrypted message encrypted using a public key;
    decrypting the encrypted message using a private key associated with the public key; and
    extracting the symmetric key from the decrypted message.

8. The method of claim 1, further comprising:
    determining that the sender is the client device based on the identified transmission identification and the stored mapping.

9. The method of claim 8, further comprising:
    deleting a mapping between the identified transmission identification and the session identification associated with the client device responsive to determining that the sender is the client device.

10. A non-transitory computer readable storage medium storing instruction for protecting the privacy of a client device transmitting a message via a wireless signal, the instructions when executed by a processor, cause the processor to:
    receive a request, from the client device, to connect to a base station;
    associate a session identification to the client device;
    generate a set of transmission identifications based on the session identification comprising generating a plurality of pseudo-random numbers based on the session identification and a secret key, each transmission identification of the set of the transmission identifications identifying a frequency channel and a time slot for the client device to wirelessly transmit a message to the base station;
    store a mapping between the transmission identifications of the set of transmission identifications and the session identification associated with the client device;
    transmit the set of transmission identifications to the client device;
    receive the message; and
    identify a transmission identification, based at least in part on a frequency channel and a time slot at which the message is received.

11. The non-transitory computer readable storage medium of claim 10, wherein the secret key is replaced at predefined time intervals.

12. The non-transitory computer readable storage medium of claim 10, wherein the pseudo-random number is generated using a block cipher.

13. The non-transitory computer readable storage medium of claim 10, wherein the instructions further cause the processor to generate a plurality of consecutive values based on the session identification, and wherein each of the transmission identifications of the set of transmission identifications is generated based on a previous value of the generated plurality of consecutive values.

14. The non-transitory computer readable storage medium of claim 10, further comprising instructions that when executed by the processor cause the processor to receive a symmetric key from the client device.

15. The non-transitory computer readable storage medium of claim 14, wherein the instruction to transmit the set of transmission identification further comprises instructions that when executed by the processor cause the processor to:
encrypt the set of transmission identifications using the symmetric key; and
transmit the encrypted set of transmission identifications to the client device.

16. The non-transitory computer readable storage medium of claim 14, wherein the instructions to receive the symmetric key further comprises instructions that when executed by the processor cause the processor to:
receive an encrypted message, the encrypted message encrypted using a public key;
decrypt the encrypted message using a private key associated with the public key; and
extract the symmetric key from the decrypted message.

17. The non-transitory computer readable storage medium of claim 10, further comprising instructions that when executed by the processor cause the processor to:
determine that the sender is the client device based on the identified transmission identification and the stored mapping.

18. The non-transitory computer readable storage medium of claim 17, further comprising instructions that when executed by the processor cause the processor to:
delete a mapping between the identified transmission identification and the session identification associated with the client device responsive to determining that the sender is the client device.

19. A method for protecting the privacy of a client device transmitting a message via a wireless signal, the method comprising:
receiving a request, from the client device, to connect to a base station;
associating a session identification to the client device;
generating a plurality of consecutive values based on the session identification;
generating a set of transmission identifications based on a previous value of the generated plurality of consecutive values, each transmission identification of the set of the transmission identifications identifying a frequency channel and a time slot for the client device to wirelessly transmit a message to the base station;
storing a mapping between the transmission identifications of the set of transmission identifications and the session identification associated with the client device;
transmitting the set of transmission identifications to the client device;
receiving the message; and
identifying a transmission identification, based at least in part on a frequency channel and a time slot at which the message is received.

20. The method of claim 19, wherein the plurality of consecutive numbers start at a value of the session identification multiplied by a number of consecutive numbers to be generated.

21. The method of claim 19, wherein the set of transmission identifications are further based on a secret key.

22. The method of claim 21, wherein the secret key is generated by a domain authority.

23. A method for protecting the privacy of a client device transmitting a message via a wireless signal, the method comprising:
receiving a request, from the client device, to connect to a base station;
associating a session identification to the client device;
generating a set of transmission identifications based on the session identification, each transmission identification of the set of the transmission identifications identifying a frequency channel and a time slot for the client device to wirelessly transmit a message to the base station;
storing a mapping between the transmission identifications of the set of transmission identifications and the session identification associated with the client device;
transmitting the set of transmission identifications to the client device;
receiving a message from a sender;
identifying a transmission identification, based at least in part on a frequency channel and a time slot at which the message is received;
determining that the sender is the client device based on the identified transmission identification and the stored mapping; and
deleting a mapping between the identified transmission identification and the session identification associated with the client device responsive to determining that the sender is the client device.

24. The method of claim 23, further comprising responsive deleting every mapping of the set of transmission identifications:
associating a second session identification to the client device;
generating a second set of transmission identifications based on the second session identification;
storing a second mapping between the second transmission identifications of the set of transmission identifications and the second session identification associated with the client; and
transmitting the second set of transmission identifications to the client device.

25. The method of claim 23, further comprising receiving a symmetric key from the client device; and wherein transmitting the set of transmission identification comprises:
encrypting the set of transmission identifications using the symmetric key; and
transmitting the encrypted set of transmission identifications to the client device.

26. The method of claim 23, wherein the transmission identification is further identified based on a digital identifier included in the received message.

27. A non-transitory computer readable storage medium storing instruction for protecting the privacy of a client device transmitting a message via a wireless signal, the instructions when executed by a processor, cause the processor to:
receive a request, from the client device, to connect to a base station;
associate a session identification to the client device;
generate a plurality of consecutive values based on the session identification;
generate a set of transmission identifications based on a previous value of the generated plurality of consecutive values, each transmission identification of the set of the transmission identifications identifying a frequency channel and a time slot for the client device to wirelessly transmit a message to the base station;
store a mapping between the transmission identifications of the set of transmission identifications and the session identification associated with the client device;
transmit the set of transmission identifications to the client device;
receive the message; and identify a transmission identification, based at least in part on a frequency channel and a time slot at which the message is received.

28. The non-transitory computer readable storage medium of claim 27, wherein the plurality of consecutive numbers start at a value of the session identification multiplied by a number of consecutive numbers to be generated.

29. The non-transitory computer readable storage medium of claim 27, wherein the set of transmission identifications are further based on a secret key.

30. The non-transitory computer readable storage medium of claim 29, wherein the secret key is generated by a domain authority.

31. A non-transitory computer readable storage medium storing instruction for protecting the privacy of a client device transmitting a message via a wireless signal, the instructions when executed by a processor, cause the processor to:

receive a request, from the client device, to connect to a base station;
associate a session identification to the client device;
generate a set of transmission identifications based on the session identification, each transmission identification of the set of the transmission identifications identifying a frequency channel and a time slot for the client device to wirelessly transmit a message to the base station;
store a mapping between the transmission identifications of the set of transmission identifications and the session identification associated with the client device; and
transmit the set of transmission identifications to the client device;
receive a message from a sender;
identify a transmission identification, based at least in part on a frequency channel and a time slot at which the message is received;
determine that the sender is the client device based on the identified transmission identification and the stored mapping; and
delete a mapping between the identified transmission identification and the session identification associated with the client device responsive to determining that the sender is the client device.

32. The non-transitory computer readable storage medium of claim 31, further comprising instructions that when executed by the processor cause the processor to responsive deleting every mapping of the set of transmission identifications:

associate a second session identification to the client device;
generate a second set of transmission identifications based on the second session identification;
store a second mapping between the second transmission identifications of the set of transmission identifications and the second session identification associated with the client; and
transmit the second set of transmission identifications to the client device.

33. The non-transitory computer readable storage medium of claim 31, further comprising instructions that when executed by the processor cause the processor to receive a symmetric key from the client device; and wherein transmitting the set of transmission identification comprises:

encrypting the set of transmission identifications using the symmetric key; and
transmitting the encrypted set of transmission identifications to the client device.

34. The non-transitory computer readable storage medium of claim 31, wherein the transmission identification is further identified based on a digital identifier included in the received message.

* * * * *

UNITED STATES PATENT AND TRADEMARK OFFICE
CERTIFICATE OF CORRECTION

PATENT NO. : 9,788,198 B2
APPLICATION NO. : 14/821648
DATED : October 10, 2017
INVENTOR(S) : Vladan Djakovic et al.

Page 1 of 1

It is certified that error appears in the above-identified patent and that said Letters Patent is hereby corrected as shown below:

In the Claims

-Column 10, Claim 10, Line 27: "instruction" should be changed to "instructions"
-Column 11, Claim 15, Line 2: "instruction" should be changed to "instructions"
-Column 12, Claim 25, Line 38: "identification" should be changed to "identifications"
-Column 12, Claim 27, Line 47: "instruction" should be changed to "instructions"
-Column 13, Claim 31, Line 15: "instruction" should be changed to "instructions"

Signed and Sealed this
First Day of May, 2018

Andrei Iancu
*Director of the United States Patent and Trademark Office*